United States Patent
Troster

[11] 3,920,662
[45] Nov. 18, 1975

[54] PERINONE DYESTUFFS AND PROCESS FOR PREPARING THEM

[75] Inventor: Helmut Troster, Frankfurt am Main, Germany

[73] Assignee: Hoechst Aktiengesellschaft, Frankfurt am Main, Germany

[22] Filed: Aug. 2, 1973

[21] Appl. No.: 384,794

[30] Foreign Application Priority Data

Aug. 4, 1972  Germany............................ 2238378

[52] U.S. Cl..................... 260/283 S; 260/247.2 A; 260/247.2 B; 260/247.5 EP; 260/247.5 GP; 260/268 PC; 260/268 TR; 260/282; 260/283 CN; 260/287 CF; 260/288 CF
[51] Int. Cl.²....................................... C07D 217/24
[58] Field of Search ........... 260/283 S, 282, 288 CF

[56] References Cited
FOREIGN PATENTS OR APPLICATIONS
1,071,386   6/1967   United Kingdom................. 260/282

Primary Examiner—Paul M. Coughlan, Jr.
Assistant Examiner—Mary C. Vaughn
Attorney, Agent, or Firm—Curtis, Morris & Safford

[57] ABSTRACT

Dyestuffs consisting of the mixture of isomers of the formulae

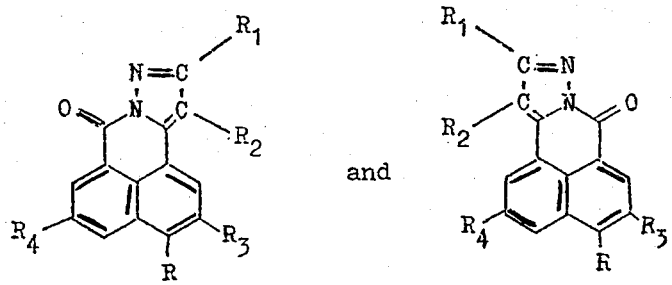

wherein $R_1$ is hydrogen, alkyl with 1 to 20 carbon atoms, alkoxyalkyl or alkoxycarbonyl each with up to 4 carbon atoms, benzyl, alkoxycarbonyl with up to 20 carbon atoms or phenyl, $R_2$ is alkoxycarbonyl with up to 20 carbon atoms, cyano, alcanoyl, alkoxyalkoxycarbonyl each with up to 4 carbon atoms, carbonamido, phenylcarbonamido, mono- or dialkylcarbonamido with up to 8 carbon atoms or cyclohexylcarbonamido, $R_3$ and $R_4$ are identical and are hydrogen or alkoxy with 1 to 4 carbon atom atoms or $R_3$ is alkoxy with 1 to 4 carbon atoms and $R_4$ is hydrogen and R is phenylthio which may be substituted by one or two chlorine or bromine atoms, alkyl, alkoxy, carbalkoxy, alkylsulfonyl groups and with up to 4 carbon atoms or a cyano, trifluoromethyl or nitro group; naphthylthio, pyridinethio, benzimidazolyl-2-thio, benzoxazolyl-2-thio, benzthiazolyl-2-thio or an amino group of the formula

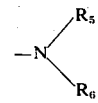

wherein $R_5$ and $R_6$ are hydrogen, alkyl or hydroxyalkyl with 1 to 4 carbon atoms or phenyl, or together are piperidine, morpholine or piperazine.

The new dyestuffs are very suitable for the dyeing of synthetic materials such as polyethylene-glycol terephthalate, acetyl cellulose or polyamides. They yield brilliant greenish yellow to orange red shades which have a good fastness to light and to thermofixation. They are also very suitable for the dyeing of fibre-forming polymers such as for example polyethylene-glycol terephthalate in the mass. Furthermore, a big part of the dyestuffs can be used for dyeing synthetic fibre materials such as polyester fibers from organic solvents, for example perchloroethylene.

5 Claims, No Drawings

PERINONE DYESTUFFS AND PROCESS FOR PREPARING THEM

The invention relates to a novel valuable dyestuff consisting of the mixture of isomers of the formulae I

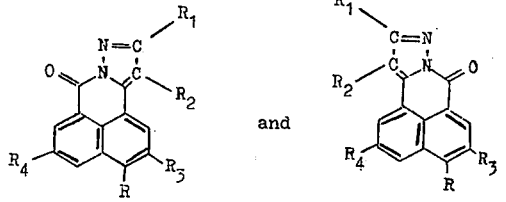

and (I)

wherein $R_1$ is hydrogen, alkyl having 1 to 20 carbon atoms, alkoxyalkyl or alkoxycarbonyl having each up to 4 carbon atoms, benzyl, alkoxycarbonyl having up to 20 carbon atoms or phenyl, $R_2$ is alkoxycarbonyl having up to 20 carbon atoms, acyl, cyano, alkoxyalkoxycarbonyl having each up to 4 carbon atoms, carbonamido, phenylcarbonamido, mono- or dialkyl-carbonamido having up to 8 carbon atoms or cyclohexylcarbonamido, $R_3$ and $R_4$ are identical and represent hydrogen atoms or alkoxy having 1 to 4 carbon atoms or $R_3$ is alkoxy having 1 to 4 carbon atoms and $R_4$ is hydrogen and R is a phenylthio group which may be substituted by one or two chlorine or bromine atoms, alkyl, alkoxy, carbalkoxy, alkylsulfonyl having each up to 4 carbon atoms or cyano, trifluoromethyl or nitro, naphthylthio, pyridinethio, benzimidazolyl-2-thio, benzoxazolyl-2-thio, benzthiazolyl-2-thio group or an amino group of the formula

wherein $R_5$ and $R_6$ represent hydrogen, alkyl or hydroxyalkyl having 1 to 4 carbon atoms or phenyl, whereby two alkyl groups may form a piperidine ring or under inclusion of an oxygen or nitrogen atom a morpholine or piperazine ring.

Preferred are the dyestuffs of the above formulae I, wherein $R_1$ represents lower alkyl, $R_2$ lower carbalkoxy or acyl and R represents an optionally substituted phenylthio or morpholine group.

The invention further relates to a process for preparing these novel dyestuffs, which comprises reacting in any order desired a naphthalic acid hydrazide of the formula II or III

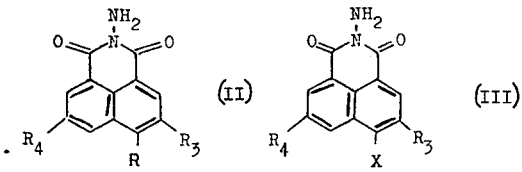

wherein X is chlorine or bromine, with a compound of the formula IV $$R - H$$
(IV)

and a carbonyl compound of the formula V

(V)

whereby, in the reaction with the carbonyl compound (V) the hydrozone obtained first having the formula VI or VII

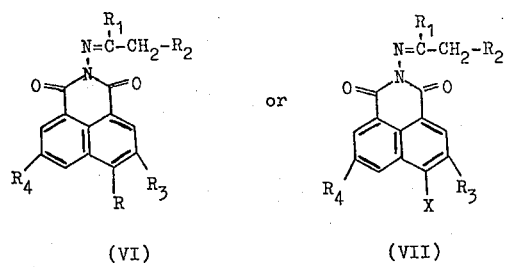

subsequently was cyclized in the presence of basic condensation agents to give the pair of isomers of the formulae VIII and IX or X and XI

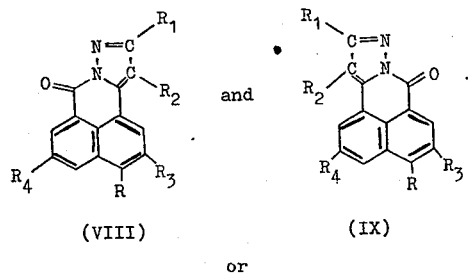

or

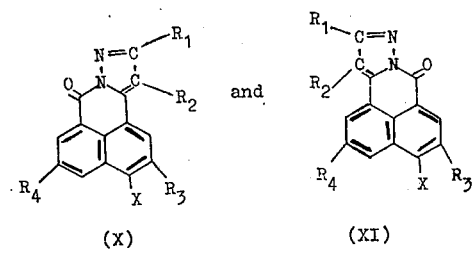

$R_1$, $R_2$, $R_3$, $R_4$ and R have the above-mentioned meanings.

The starting compounds of the formula III may be prepared in known manner by condensation of 4-chloro- or 4-bromo-naphthalic acid anhydrides with equivalent amounts of hydrazine in inert organic solvents such as alcohols or acid dialkyl amides (J. Am. Soc. 82, 2728 [1960]).

The reaction of those compounds of the formula IV which have an —SH group with the compounds of the formula III or X and XI is preferably carried out in the presence of at least the equivalent amount of an alkali acetate, hydroxide or -carbonate at an elevated temperature, preferably in an organic solvent, such as alcohol, pyridine or acid dialkyl amide. Examples for those mercapto compounds are thiophenol, 2- and 4-methyl-, 3,4-dimethyl-, 4-isopropyl-, 4-dodecyl-, 4-methoxy-, 3,4-dimethoxy-, 4-chloro-, 2,5-dichloro-, 4-bromo-, 2-methyl-5-chloro-, 2-methoxy-5-chloro-, 4-methylsulfonyl-, 4-methylsulfonyl, 3-ethoxycarbonyl-, 4-cyano-, 3-trifluoromethylthiophenol, α-thionaphthol, 4-mercaptopyridine, 2-mercaptobenzthiazole, 6-methyl-2-mercapto-, 6-methoxy-2-mercapto- and 5-chloro-2-mercaptobenzthiazole, 2-mercaptobenzimidazole, 2-mercaptobenzoxazole.

For the reaction with an amine of the formula

the compounds III or X and XI are heated with an at least molar excess of the corresponding amine, if desired under pressure, to temperatures between about 100°C and about 200°C. The reaction time is about 1 to 8 hours. Condensation may also be carried out in a similar way in an organic solvent such as an acid dialkylamide, if desired in the presence of an acid-binding agent such as for example Na— or potassium acetate. The product formed may be isolated in usual manner either directly or after diluting with water or a suitable solvent having a low boiling point such as methanol.

Examples for these amines are aniline, o-toluidine, methyl and ethyl-aniline, 3-trifluoromethyl-aniline, 3-tetrafluoroethoxy-aniline, N-β-hydroxyethyl-aniline, 3-ethylaminotoluene, 3-β-hydroxyethylamino-toluene, dimethyl amine, dibutyl amine, di-(cyanethyl)-amine, di-(chloroethyl)-amine, diethanolamine, morpholine, 2,6-dimethyl-morpholine, piperidine, 4-methylpiperidine.

For the reaction with the carbonyl compound of the formula V the compounds of the formula II or III are condensed at first with at least equivalent amounts of this carbonyl compound in the presence of about 0.01 to 0.1 mol of an acidic condensation agent per mol of starting compound. As acidic condensation agents may be considered aromatic sulfonic acids such as benzene or toluene-sulfonic acid, alkane-sulfonic acids such as ethane-sulfonic acid, amidosulfonic acid, sulfuric acid, phosphoric acid or gaseous hydrogen chloride. When using protic solvents such as acetic acid or propionic acid, these solvents already act as acidic condensation agent.

Condensation may be effected either in an inert organic solvent such as ethanol, isobutanol, monomethylglycol, acetic acid, chlorobenzene, dichlorobenzene, nitrobenzene, dimethyl formamide, N-methylpyrrolidone or directly with an excess of the carbonyl compound at a temperature of from about 80° C to about 200° C, if desired under pressure. The reaction time is between about 30 minutes and 8 hours. In some cases it is suitable to remove the reaction water and other easily volatile by-products such as alcohol and acetone by distillation from the reaction mixture. After cooling the hydrazone formed may be isolated directly or after diluting with a solvent precipitating the hydrazone, such as for example methanol, glacial acetic acid or water.

Examples for carbonyl compounds of the formula V are acetoacetic acid methyl-, ethyl-, butyl-, isopropyl-, -2-ethoxyethyl ester, γ-diethylacetoacetic acid ethyl ester, phenylacetoacetic acid ethyl ester, benzoyl and 4-methoxybenzoylacetic acid ethyl ester, oxalacetic acid diethyl ester, acetyl-acetone, benzoylacetone, γ-dimethylacetylacetone, dibenzoylmethane, γ-ethoxyacetylacetone, acetyl- and benzoyl pyruvic acid ethyl ester, acetonedicarboxylic acid dimethyl ester, benzoylacetonitrile, formylacetophenone, acetoacetic acid amide, acetoacetic acid methyl- and diethylamide, acetoacetic acid -anilide, -p-anisidide, -3-chloro-anilide, -5chloro-2-toluidide, -o-toluidide, -cyclohexylamide, -octylamide, 2,4-dichlorobenzoylacetic acid amide.

The ring closure of the hydrazone to form the pyrazol is expediently carried out in an organic solvent such as butanol, isobutanol, pyridine, dimethyl sulfoxide, but preferably in acid dialkyl amides such as dimethyl formamide, dimethyl acetamide, hexamethyl-phosphoric acid triamide or N-methylpyrrolidone in the presence of a basic compound such as sodium or potassium acetate, -carbonate or -hydroxide, piperidine, morpholine or triethyl amine at a temperature of from about 80°C and the boiling point of the solvent used.

If the hydrazone has already been prepared in an organic solvent of the above-mentioned type, it may be cycled directly in the reaction mixture, without previous isolation, after neutralization of the acidic condensation agent by addition of one of the bases mentioned. The product thus obtained may be isolated in usual manner.

The new dyestuffs are very suitable for the dyeing of synthetic materials such as polyethylene-glycol terephthalate, acetyl cellulose or polyamides. They yield brilliant greenish yellow to orange red shades which have a good fastness to light and to thermofixation. They are also very suitable for the dyeing of fibre-forming polymers such as for example polyethylene-glycol terephthalate in the mass. Furthermore, a big part of the dyestuffs can be used for dyeing synthetic fibre materials such as polyester fibers from organic solvents, for example perchloroethylene.

In contradistinction to next comparable dyestuffs known from German patent specifications Nos. 1,279,260 and 1,265,325 the products of the invention are distinguished by a better affinity to polyester and a better fastness of the dyeings to sublimation.

The following Examples illustrate the invention.

EXAMPLE 1 a. 64.0 Grams of 4-phenylthionaphthalic acid were stirred for 2 hours at 130°C in 180 g of acetacetic acid ethyl ester in the presence of 0.34 g of p-toluene-sulfonic acid, while passing thru a weak nitrogen stream. The clear solution was cooled to room temperature, diluted with 200 ml of methanol, and the crystallized light-yellow ethylester hydrazone was suction-filtered, washed with methanol and water and dried. The compound melted at 152°–153°C. If instead of acetacetic acid ethyl ester the same amount of the corresponding methyl ester was used, the methylester hydrazone having a melting point of 181°–183°C was obtained in analogous way.

b. A mixture of 86.4 g of the ethyl ester hydrazone obtained according to (a), 300 ml of dimethyl formamide and 0.4 g of anhydrous potassium acetate was kept at the boil for 1 hour. When cooling, the mixture of dyestuff isomers of the formulae

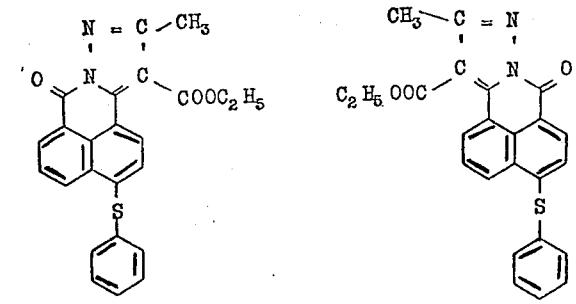

was crystallized in golden-yellow crystals. The suspension was diluted with 300 ml of ethanol, suction-filtered, washed with water and dried.

Analysis: Calc: C, 69.6; H, 4.3; N, 6.8; S, 7.7. Found: C, 69.5; H, 4.5; N, 7.2; S, 7.6.

On polyester fabrics brilliant greenish-yellow dyeings were obtained having a very good fastness to light and to sublimation.

Dyeings having similar properties were obtained with the dyestuff obtained in the same manner from the methylester hydrazone.

c. The same mixture of dyestuff isomers was obtained when 21.6 g of the ethyl ester hydrazone obtained according to (a), 200 ml of ethylglycol-monomethyl ether and 0.1 g of potassium hydroxide were cyclized for 1 hour at boiling temperature.

EXAMPLE 2 a. 75.0 Grams of acetylacetone were added to a mixture of 96.0 g of 4-phenylthionaphthalic acid hydrazide, 525 ml of isobutanol and 0.6 g of benzene-sulfonic acid and the mixture was kept at the boil for 3 hours. The hydrazone which crystallized, when cooling, in slightly yellow needles was suction-filtered, washed with methanol and water and dried. It melted at 197°–200°C.

b. 10.0 Grams of the hydrazone obtained according to (a) were refluxed in 80 ml of isobutanol after addition of 0.2 g of anhydrous potassium acetate. The yellow mixture of dyestuff isomers precipitated having the formulae

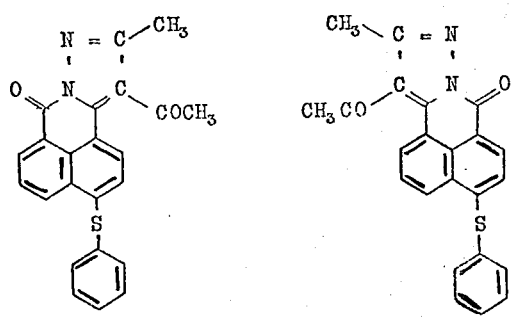

was suction-filtered at room temperature, washed with methanol and water and dried.

Analysis: Calc: C, 71.8; H, 4.2; N, 7.3; S, 8.3. Found: C, 71.9; H, 4.3; N, 7.3; S, 8.3.

The compound dyed polyester fibres in brilliant yellow shades which are distinguished by an excellent fastness to light and to sublimation.

c. A mixture of 15 g of the hydrazone obtained according to (a), 30 g of dimethyl formamide and 0.5 g of piperidine was kept at the boil for 2 hours. The mixture of dyestuff isomers which crystallized when cooling was identical to the product obtained according to (b). Instead of piperidine the equivalent amount of morpholine or triethyl amine may be used with the same success as a catalyst.

EXAMPLE 3 a. A suspension of 25 g of 3-methoxy-4-(4'-chlorophenyl-thio)-naphthalic acid hydrazide and 150 g of acetyl acetone was stirred for 1 hour at boiling temperature after addition of 0.25 g of toluene-sulfonic acid. The crystal suspension obtained when cooling was diluted with 200 ml of methanol and the yellow hydrazone was isolated in known manner.

b. 25 Grams of the compound obtained according to (a) were stirred for one hour at 140°–145°C in 75 g of N-methylpyrrolidone in the presence of 0.3 g of anhydrous sodium acetate.

100 Milliliters methanol were added to the cooled reaction mixture and the reddish yellow dyestuff of the formula

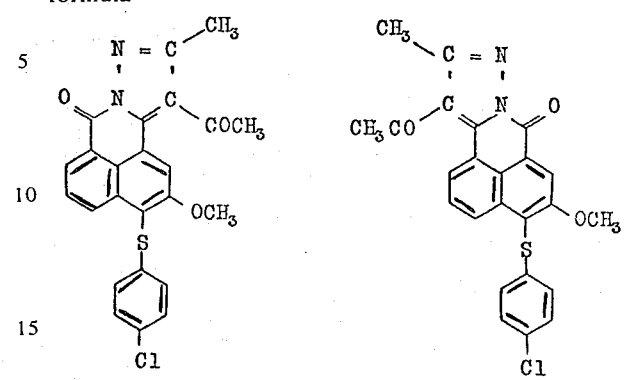

which had precipitated was isolated in usual manner. Polyester fabrics were dyed with this mixture of isomers in brilliant golden yellow shades fast to light.

EXAMPLE 4 a. 16.0 Grams of 4-phenylthionaphthalic acid hydrazide, 35 g of acetoacetic acid anilide and 0.25 g of toluene-sulfonic acid were suspended in 100 ml of chlorobenzene. The reaction mixture was refluxed for 3 hours. Then 35 ml of chlorobenzene were distilled off. The reaction product formed was crystallized slowly at room temperature. After diluting with 150 ml of methanol stirring was continued for some hours, then the pale yellow hydrazone was suction-filtered, washed with methanol and water and dried.

b. 19.2 Grams of the hydrazone obtained according to (a), 58.0 g of dimethyl acetamide and 0.25 g of anhydrous potassium carbonate were heated for 30 minutes to 150°C, the mixture was diluted with 100 ml of methanol at 20°–25°C and the lemon-yellow pair of dyestuff isomers which had precipitated corresponding to the formulae

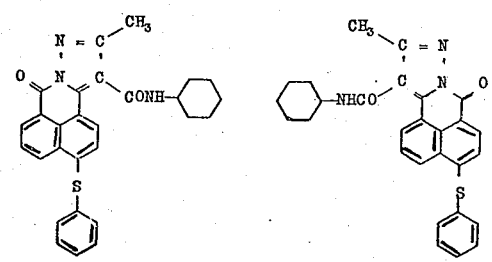

was precipitated in usual manner.

Analysis: Calc: C, 72.8; H, 4.1; N, 9.1; S, 6.9. Found: C, 72.8; H, 3.8; N, 9.3; S, 7.0.

On polyester fibres greenish yellow dyeings were obtained having a good fastness to light and to thermofixation.

EXAMPLE 5 a. 32.0 Grams of 4-phenylthionaphthalic acid hydrazide were stirred in 80 ml of acetone-dicarboxylic acid dimethyl ester. 0.25 Gram of toluene-sulfonic acid was added and the mixture was heated to 125°C by passing thru a weak nitrogen stream. After 1.5 hours the reaction mixture was cooled and diluted at 50°C with 100 ml of methanol. The lemon-yellow hydrazone precipitated melted at 187°–190°C.

Analysis: Calc: N, 5.9; S, 6.7. Found: N, 5.7; S, 6.8.

b. A mixture of 33.4 g of the hydrazone obtained according to (a), 80 ml of dimethyl formamide and 0.33 g of anhydrous potassium acetate was stirred for 15 minutes at 145°C. Then the mixture was diluted at 20°–25°C with 50 ml of methanol.

The crystallized reddish yellow dyestuff of the formula

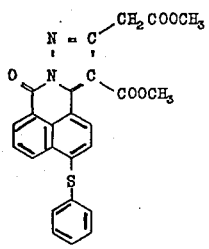 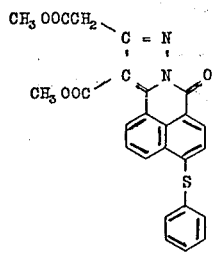

had an excellent affinity to polyester fibre materials. It yielded a brilliant yellow with a very good fastness to light and to sublimation.

Analysis: Calc: C, 65.4; H, 3.9; N, 6.1; S, 6.9. Found: C, 64.6; H, 4.0; N, 5.9; S, 6.9.

EXAMPLE 6 a. 32.0 Grams of 4-phenylthionaphthalic acid hydrazide, 32.5 g of benzoyl acetone and 0.24 g of toluene-sulfonic acid were stirred in 120 ml of o-dichlorobenzene for 2 hours at 130°–135°c. The lemon-yellow hydrazone formed having a melting point of 199°–202°C was isolated as usual with 100 ml of methanol.

Analysis: Calc: N, 6.0; S, 6.9. Found: N, 5.6; S, 6.7.

B. 32.4 Grams of the hydrazone obtained according to (a) were cyclized according to Example 5(b). The mixture of dyestuff isomers formed of the formula

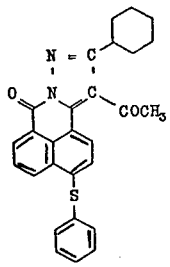 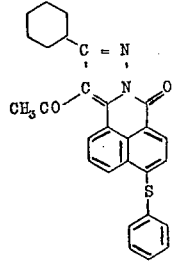

dyed polyester fabrics in brilliant greenish yellow shades. The dyeings were distinguished by a very good fastness to light and an excellent fastness to light and to thermofixation.

EXAMPLE 7 a. A mixture of 24.6 g of 4-chloronaphthalic acid hydrazide, 20.0 g of acetyl acetone and 100 ml of acetic acid was refluxed for 2 hours. The brownish crystal powder was suction-filtered, washed with glacial acetic acid and dried. After recrystallization from ethylene-glycol-monomethyl ether slightly brownish crystals were obtained which melted at 211°–213°C.

b. 20.4 Grams of the hydrazone obtained according to (a) were refluxed with 61.2 g of dimethyl formamide and 0.2 g of anhydrous potassium carbonate for 30 minutes. When cooling, the slightly brownish yellow cyclization product was crystallized at about 75°C. It consisted of the mixture of isomers of the formulae

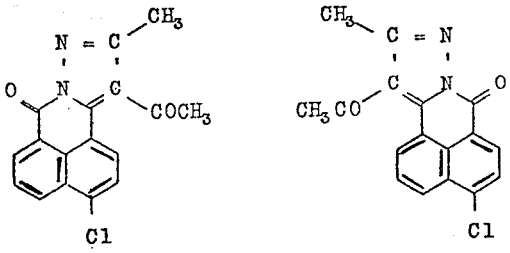

Analysis: Calc: Cl, 11,4; N, 9.0. Found: Cl, 11,6; N, 9.1.

c. The mixture of pyrazolisomers obtained according to (b) could be prepared without intermediate isolation of the hydrazone obtained according to (a), when the reaction was carried out as follows:

24.6 Grams of 4-chloronaphthalic acid hydrazide, 20.0 g of acetyl acetone and 0.24 g of toluene-sulfonic acid were refluxed and kept at the boil for 2 hours. Then 0.15 g of potassium carbonate and 0.5 g of anhydrous potassium acetate was added at 80°C and again kept at the boil for 2 hours. The mixture of pyrazolisomers was identical with the product obtained according to (b).

d. 9.8 Grams of 2,5-dichlorothiophenol were added to a mixture of 15.5 g of the mixture of isomers obtained according to (b) and 10.0 g of anhydrous potassium acetate in 150 ml of ethylene-glycol-monomethyl ether, and the mixture was stirred for 1 hour at boiling temperature. The crystallized yellow mixture of dyestuff isomers of the formulae

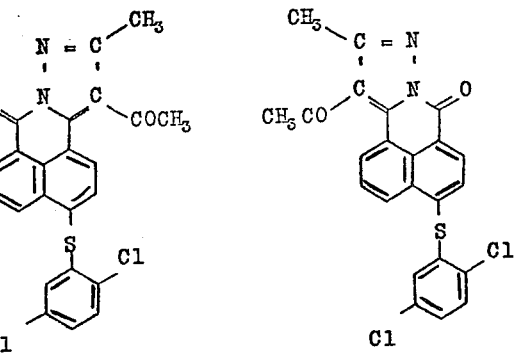

was isolated in usual manner. Polyester fabrics could be dyed in brilliant yellow shades fast to light and to sublimation. If instead of 2,5-dichlorothiophenol the equivalent amount of 4-methyl-3,4-dimethoxy, 2-methyl-5-chloro, 4-bromo-or 3-ethoxythiophenol was used, yellow pairs of dyestuff isomers were obtained having similar tinctorial properties.

EXAMPLE 8

24.6 Grams of 4-chloronaphthalic acid hydrazide, 20.0 g of acetyl acetone and 0.24 g of toluene-sulfonic acid were refluxed in 250 ml of isobutanol for 2 hours. Then 20.0 g of anhydrous potassium acetate and 12.0 g of thiophenol were added to the reaction mixture at room temperature, and the mixture was kept again at the boil. Finally 7 g of potash were added at 70°C and the whole was stirred at boiling temperature for 1 hour. The dyestuff formed was identical with the dyestuff obtained according to Example 2(b).

EXAMPLE 9 a. 8 Drops of concentrated sulfuric acid were added to a mixture of 29.1 g of 4-bromonaphthalic acid hydrazide and 32.5 g of benzoyl acetone in 100 ml of chlorobenzene. The reaction mixture was stirred for one hour at boiling temperature. After cooling the mixture was diluted with 100 ml of methanol and the nearly colorless hydrazone crystallized was isolated in usual manner. It was cyclized according to Example 7(b) to form the mixture of pyrazolisomers of the formulae

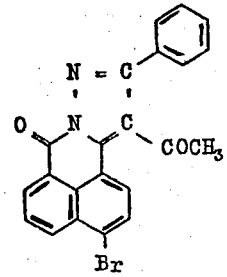 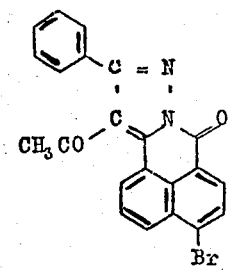

b. 21.5 Grams of the mixture of isomers obtained according to (a) and 10.0 g of anhydrous potassium carbonate were suspended in 240 ml of butanol. After adding 13.5 g of 4-methylthiophenol the mixture was refluxed for 3 hours. The yellow dyestuff mixture obtained of the formula

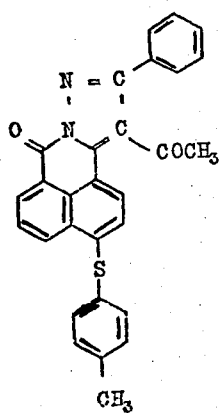 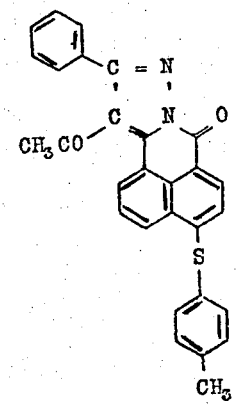

dyed on polyester materials a clear greenish yellow having a very good fastness to light and to sublimation.

EXAMPLE 10 a. 0.25 Grams of toluene-sulfonic acid was added to a mixture of 18.5 g of 4-(benzimidazolo-2'-thio)-naphthalic acid hydrazide and 75.5 g of acetyl acetone, and the mixture was heated to the boil for 30 minutes. At 70°C the reaction mixture was diluted with 80 ml of methanol. The light-yellow hydrazone formed was isolated as usual. It melted at 268°C under decomposition.

b. 9.2 Grams of the hydrazone obtained according to (a) and 0.2 g of anhydrous potassium acetate were stirred in 35 ml of dimethyl formamide for 10 minutes at 145°C. The mixture was diluted at 20°–25°C with 30 ml of methanol. The crystallized reddish yellow mixture of isomers of the formula

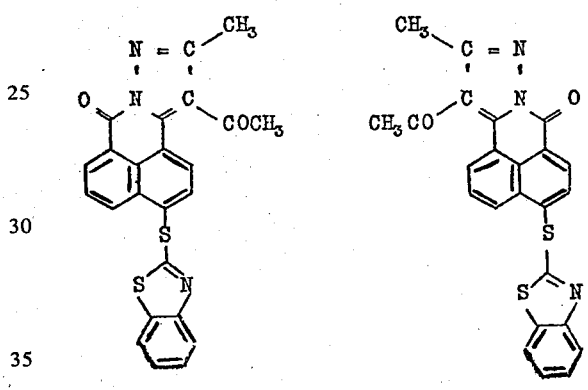

dyed polyester with a clear yellow fast to sublimation. The following Table lists further dyestuffs which have been obtained according to the methods described in the above Examples:

| Example | $R_1$ | $R_2$ | $R_3$ | $R_4$ | R | Shade (polyester) |
|---|---|---|---|---|---|---|
| 11 | —CH$_3$ | —COOC$_3$H$_7$ | H | | —⟨⟩—Cl | greenish yellow |
| 12 | —CH$_3$ | —COOC$_4$H$_9$ | H | H | —⟨⟩ | greenish yellow |
| 13 | —CH$_3$ | —COOC$_2$H$_5$ | OCH$_3$ | H | —⟨⟩ | yellow |
| 14 | —CH$_3$ | —COOCH$_3$ | OCH$_3$ | H | —⟨⟩(OCH$_3$)(OCH$_3$) | reddish yellow |
| 15 | —C$_2$H$_5$ | —COOC$_2$H$_5$ | H | H | —⟨⟩(CH$_3$O)(Cl) | yellow |
| 16 | —CH$_3$ | —COOC$_2$H$_5$ | H | H | —⟨⟩—CN | greenish yellow |
| 17 | —CH$_3$ | —COOC$_2$H$_5$ | H | H | —⟨⟩—SO$_2$CH$_3$ | greenish yellow |
| 18 | —CH$_3$ | —COOC$_2$H$_5$ | H | H | —⟨⟩—OC$_2$H$_5$ | yellow |

-continued

| Example | R₁ | R₂ | R₃ | R₄ | R | Shade (polyester) |
|---|---|---|---|---|---|---|
| 19 | —C₆H₅ | —COOC₂H₅ | H | H | —C₆H₅ | greenish yellow |
| 20 | —C₆H₄—OCH₃ | —COOC₂H₅ | H | H | —C₆H₄—Cl | greenish yellow |
| 21 | —CH₂—C₆H₅ | —COOC₂H₅ | H | H | —C₆H₅ | greenish yellow |
| 22 | —CH₂OCH₃ | —COOC₂H₅ | H | H | —C₆H₄—OCH₃ | yellow |
| 23 | —CH(C₂H₅)₂ | —COOC₂H₅ | H | H | —C₆H₄—CH₃ | yellow |
| 24 | —CH₃ | —COCH₃ | H | H | —C₆H₄—CF₃ | greenish yellow |
| 25 | —CH₃ | —COCH₃ | H | H | —C₆H₄—NO₂ | greenish yellow |
| 26 | —CH₃ | —COCH₃ | OCH₃ | OCH₃ | —C₆H₅ | reddish red |
| 27 | —CH₃ | —COCH₃ | OC₂H₅ | H | —C₆H₅ | yellow |
| 28 | —CH₃ | —COCH₃ | H | H | —C₆H₄—(CH₂)₁₁CH₃ | yellow |
| 29 | —CH₃ | —COCH₃ | H | H | benzothiazol-2-yl (with CH₃) | yellow |
| 30 | —CH₃ | —COCH₃ | H | H | benzoxazol-2-yl | yellow |
| 31 | —CH₃ | —COCH₃ | H | H | benzimidazol-2-yl | yellow |
| 32 | —CH₃ | —COCH₃ | OCH₃ | H | —C₆H₄—OCH₃ | reddish yellow |
| 33 | —CH₃ | —COCH₃ | H | H | 1-naphthyl | yellow |
| 34 | —C₆H₅ | —COCH₃ | H | H | —C₆H₄—Cl | greenish yellow |
| 35 | —C₆H₅ | —COCH₃ | H | H | —C₆H₄—OCH₃ | greenish yellow |
| 36 | —C₆H₅ | —COCH₃ | OCH₃ | H | —C₆H₅ | yellow |
| 37 | —C₆H₅ | —CN | H | H | —C₆H₅ | greenish yellow |
| 38 | —C₆H₅ | —CO—C₆H₅ | H | H | —C₆H₅ | greenish yellow |
| 39 | —CH₃ | —COCH(CH₃)₂ | H | H | —C₆H₅ | yellow |
| 40 | —CH₃ | —COCH₂OC₂H₅ | H | H | —C₆H₄—OCH₃ | yellow |
| 41 | —H | —CO—C₆H₅ | H | H | —C₆H₅ | greenish yellow |
| 42 | —H | —COCH₃ | H | H | —C₆H₅ | yellow |
| 43 | —COOC₂H₅ | —COOC₂H₅ | H | H | —C₆H₅ | yellow |

-continued

| Example | R₁ | R₂ | R₃ | R₄ | R | Shade (polyester) |
|---|---|---|---|---|---|---|
| 44 | —COOC₂H₅ | —COCH₃ | H | H |  | yellow |
| 45 | —CH₂COOCH₃ | —COOCH₃ | H | H | -Cl | greenish yellow |
| 46 | —CH₂COOC₂H₅ | —COOC₂H₅ | H | H | COOC₂H₅ | yellow |
| 47 | —CH₂COOCH₃ | —COOCH₃ | OCH₃ | H |  | reddish yellow |
| 48 | —CH₃ | —CONH——OCH₃ | H | H |  | greenish yellow |
| 49 | —CH₃ | —CONH——Cl | H | H |  | greenish yellow |
| 50 | —CH₃ | —CONH—(Cl, CH₃) | H | H |  | greenish yellow |
| 51 | —CH₃ | —CON(C₂H₅)₂  | H | H |  | greenish yellow |
| 52 | —CH₃ | —CONH—(H) | H | H |  | greenish yellow |
| 53 | —CH₃ | —CONHC₈H₁₇ | H | H |  | greenish yellow |
| 54 | —CH₃ | —COCH₃ | H | H |  | yellow |
| 55 | —CH₃ | —COOC₂H₄OC₂H₅ | H | H |  | greenish yellow |
| 56 | —CH₃ | —COOC₂H₄OC₂H₅ | H | H | —Cl | greenish yellow |
| 57 | —CH₃ | —COOCH₂CH₂OCH₃ | H | H |  | greenish yellow |
| 58 | —CH₃ | —COO(CH₂)₁₁CH₃ | H | H |  | greenish yellow |
| 59 | —CH₃ | —COO(CH₂)₁₅CH₃ | H | H | —Cl | greenish yellow |
| 60 | —CH₃ | —COO(CH₂)₁₇CH₃ | H | H | —Cl | greenish yellow |
| 61 | —CH₃ | —COOCH₂CH(CH₂)₃CH₃ / C₂H₅ | H | H |  | greenish yellow |
| 62 | —(CH₂)₁₆CH₃ | —COOC₂H₅ | H | H |  | greenish yellow |
| 63 | —(CH₂)₁₀CH₃ | —COOC₂H₅ | H | H |  | greenish yellow |

EXAMPLE 64 a. 29.7 Grams of 4-morpholino-naphthalic acid hydrazide were kept at the boil with 20.0 g of acetyl acetone and 0.24 g of toluene-sulfonic acid in 100 ml of chlorobenzene for 30 minutes, while the reaction water was distilled off. The crystallized golden yellow hydrazone was suction-filtered at room temperature, washed with methanol and water and dried.

b. 50.0 Grams of the hydrazone obtained according to (a) were suspended in 125 g of dimethyl formamide and after addition of 0.5 g of potassium acetate refluxed for 30 minutes. The dyestuff mixture of the formulae

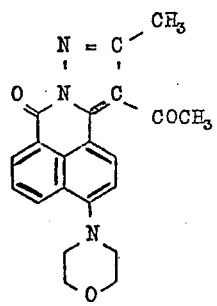 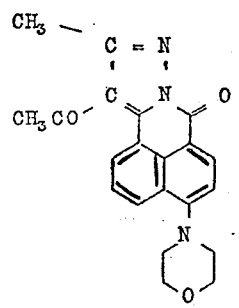

which crystallized when cooling, was suction-filtered after diluting with methanol, washed with methanol and water and dried. From methyl glycol the compound crystallized in brilliant orange crystals.

Analysis: Calc: C, 69.8; H, 5.2; N, 11.6. Found: C, 69.5; H, 5.4; N, 11.8.

With this dyestuff polyester materials could be dyed in brilliant orange shades having a good fastness to light and to sublimation.

EXAMPLE 65

If the reaction was carried out as indicated in Example 64(a) and (b), but the 4-morpholino-naphthalic acid hydrazide was replaced by the equivalent amount of 3-methoxy-4-morpholinonaphthalic acid hydrazide, the red dyestuff mixture of the following formulae was obtained

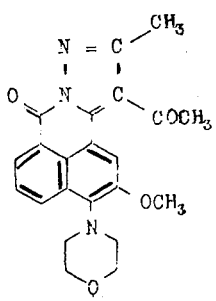 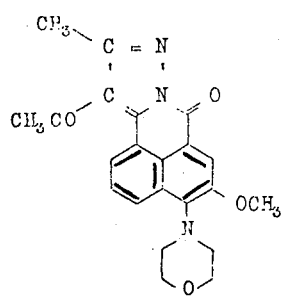

which dyed polyester fibres in brilliant orange red shades.

EXAMPLE 66

If in Example 64(a) 20.0 g of acetyl acetone were replaced by 32.5 g of benzoyl acetone and the reaction was carried out in analogous manner, the corresponding lemon-yellow hydrazone was obtained which could be cyclized according to (b) to the orange pair of dyestuff isomers of the formulae

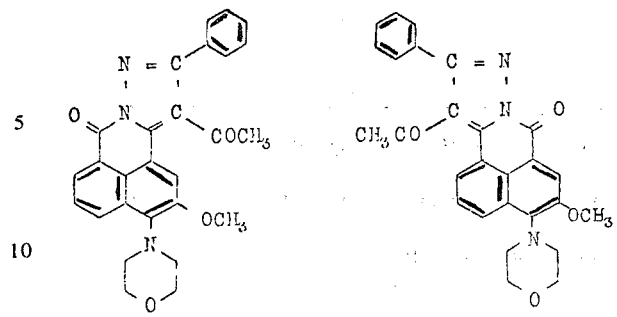

On polyester fabrics brilliant orange yellow dyeings were obtained, which were distinguished by a good fastness to light and an excellent fastness to sublimation.

EXAMPLE 67

A mixture of 9.3 g of the naphthoylene pyrazole obtained according to Example 7(b), 15.0 g of morpholine and 2.0 g of N-methyl pyrrolidone was refluxed for 1 hour. When cooling, the orange pair of dyestuff isomers was crystallized. It was identical with the product obtained according to Example 64(b).

EXAMPLE 68 a. 26.0 Grams of 4-(2',6'-dimethylmorpholino)-naphthalic acid hydrazide, 70.0 g of acetoacetic acid ethyl ester and 0.22 g of toluene-sulfonic acid were converted into the corresponding yellow hydrazone as described in Example 1(a).

b. 25.0 g of this hydrazone were cyclized as indicated in Example 64(b) in 50.0 g of dimethyl acetamide in the presence of 0.25 g of anhydrous potassium acetate to give the mixture of dyestuff isomers of the formulae

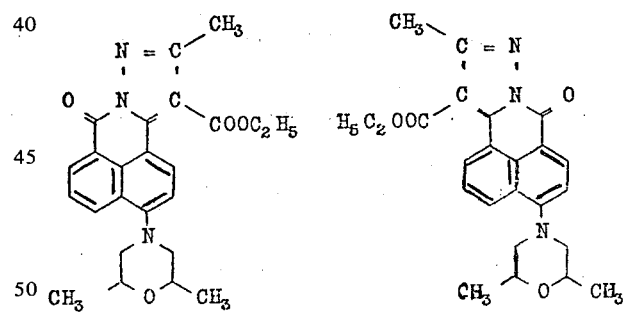

Polyester materials could be dyed in brilliant orange shades having good fastness properties.

EXAMPLE 69

4.0 Grams of 4-(4'-methylphenylamino)-naphthalic acid hydrazide obtained by condensation of 4-bromonaphthalic acid hydrazide with 4-aminotoluene, were kept at the boil for 1 hour in 20 ml of acetyl acetone in the presence of 0.04 g of toluene-sulfonic acid. After cooling the mixture was diluted with 40 ml of methanol and the brownish-yellow hydrazone which crystallized slowly was isolated in known manner. After addition of 0.02 g of anhydrous potassium acetate 2.0 g of this hydrazone were converted with 2.0 g of dimethyl formamide, by boiling for 10 minutes, into the red dyestuff mixture of the formula

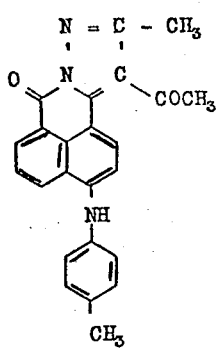 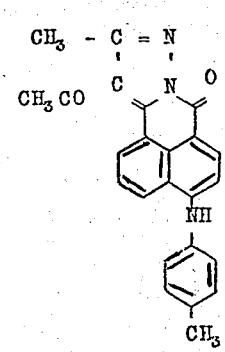

Polyester fibres could be dyed in reddish orange shades.

The following Table contains further Examples of dyestuffs which can be obtained in analogy to the above Examples.

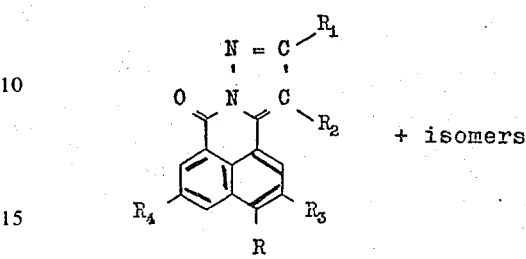

+ isomers

| Example | $R_1$ | $R_2$ | $R_3$ | $R_4$ | R | Shade (polyester) |
|---|---|---|---|---|---|---|
| 70 | —CH$_3$ | —COOCH$_3$ | H | H | —N⟨O⟩ | orange yellow |
| 71 | —CH$_3$ | —COOC$_2$H$_5$ | H | H | —N⟨O⟩ | orange yellow |
| 72 | —CH$_3$ | —COOC$_4$H$_9$ | H | H | —N⟨O⟩ | orange yellow |
| 73 | —⟨phenyl⟩ | —COOC$_2$H$_5$ | H | H | —N⟨O⟩ | orange yellow |
| 74 | —CH$_3$ | —COOC$_2$H$_5$ | OCH$_3$ | H | —N⟨O⟩ | orange red |
| 75 | —CH$_3$ | —COOC$_2$H$_5$ | H | H | —N(H)⟨⟩ | orange |
| 76 |  | —CO—⟨phenyl⟩ | H | H | —N⟨O⟩ | orange |
| 77 | —CH$_3$ | —CONH—⟨phenyl⟩ | H | H | —N⟨O⟩ | orange yellow |
| 78 | —CH$_2$COOCH$_3$ | —COOCH$_3$ | H | H | —N⟨O⟩ | orange yellow |
| 79 | —CH$_3$ | —COCH$_3$ | H | H | —N(C$_2$H$_5$)(phenyl-CH$_3$) | orange |
| 80 | —CH$_3$ | —COCH$_3$ | H | H | —NH—⟨phenyl-CF$_3$⟩ | reddish orange |
| 81 | —⟨phenyl⟩ | —COCH$_3$ | H | H | —NH—⟨phenyl⟩ | reddish orange |
| 82 | —CH$_3$ | —COCH$_3$ | H | H | —N(CH$_2$CH$_2$OH)(phenyl-OCF$_2$CF$_2$H) | orange |
| 83 | —CH$_3$ | —COCH$_3$ | H | H | —N(CH$_2$CH$_2$OH)$_2$ | orange |
| 84 | —CH$_3$ | —COCH$_3$ | H | H | —NH—⟨phenyl⟩ | reddish orange |
| 85 | —CH$_3$ | —COOCH$_2$CH$_2$OCH$_3$ | H | H | —N⟨O⟩ | orange yellow |
| 86 | —CH$_3$ | —COOCH$_2$CH$_2$OC$_2$H$_5$ | H | H | —N⟨O⟩ | orange yellow |
| 87 | —CH$_3$ | —COO(CH$_2$)$_{11}$CH$_3$ | H | H | —N⟨O⟩ | orange yellow |
| 88 | —CH$_3$ | —COOCH$_2$CH(C$_2$H$_5$)(CH$_2$)$_3$CH$_3$ | H | H | —N⟨O⟩ | orange yellow |
| 89 | —CH$_3$ | —COOC$_2$H$_5$ | H | H | —N⟨N—CH$_3$⟩ | orange yellow |

We claim:
1. Dyestuffs consisting of the mixture of isomers of the formulae

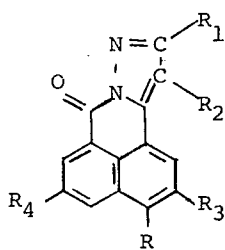 and 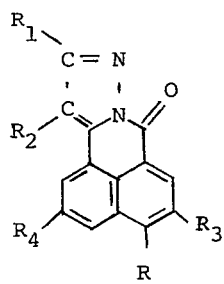

wherein $R_1$ is hydrogen, alkyl with 1 to 20 carbon atoms, alkoxyalkyl or alkoxycarbonyl each with up to 4 carbon atoms, benzyl, alkoxycarbonyl with up to 20 carbon atoms or phenyl, $R_2$ is alkoxycarbonyl with up to 20 carbon atoms, cyano, alkanoyl, alkoxyalkoxycarbonyl each with up to 4 carbon atoms, carbonamido, phenylcarbonamido, mono- or dialkylcarbonamido with up to 8 carbon atoms or cyclohexylcarbonamido, $R_3$ and $R_4$ are identical and are hydrogen or alkoxy with 1 to 4 carbon atoms or $R_3$ is alkoxy with 1 to 4 carbon atoms and $R_4$ is hydrogen and R is phenylthio which may be substituted by one or two chlorine or bromine atoms, alkyl, alkoxy, carbalkoxy, alkylsulfonyl groups each with up to 4 carbon atoms or a cyano, trifluoromethyl or nitro group, naphthylthio, pyridinethio, benzimidazolyl-2-thio, benzoxazolyl-2-thio or benzthiazolyl-2-thio.

2. Dyestuffs as claimed in claim 1 consisting of the mixture of isomers of the formulae

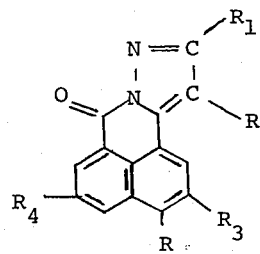 and 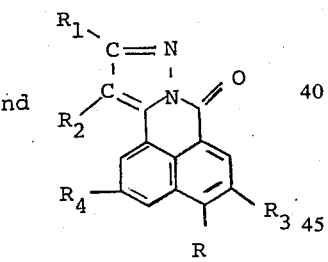

wherein R is

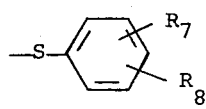

and, wherein $R_7$ and $R_8$ are hydrogen, chlorine or bromine, alkyl or alkoxy with 1 to 4 carbon atoms; $R_1$ is alkyl with 1 to 4 carbon atoms, $R_2$ is carbalkoxy or alkanoyl with up to 4 carbon atoms and $R_3$ and $R_4$ are as defined in claim 10.

3. The dyestuff consisting of the mixture of isomers of the formulae

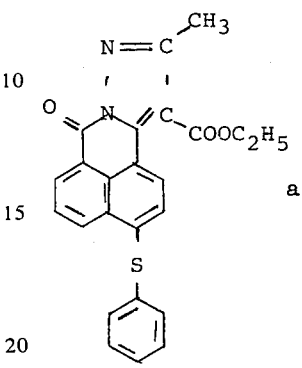 and 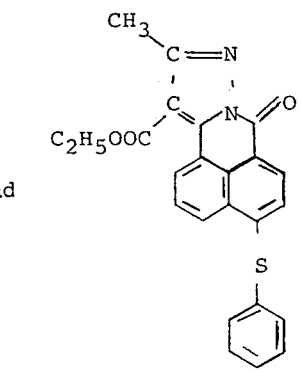

4. The dyestuff consisting of the mixture of isomers of the formlae

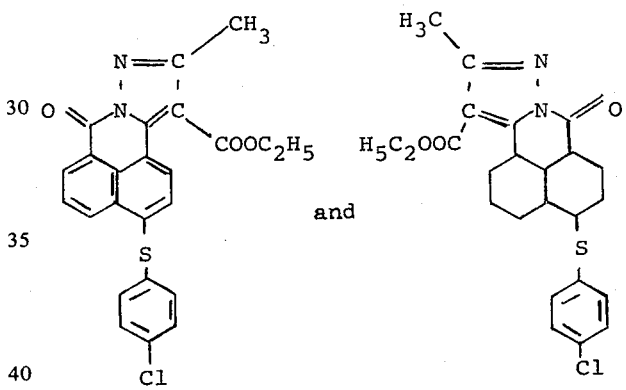

5. The dyestuff consisting of the mixture of isomers of the formulae

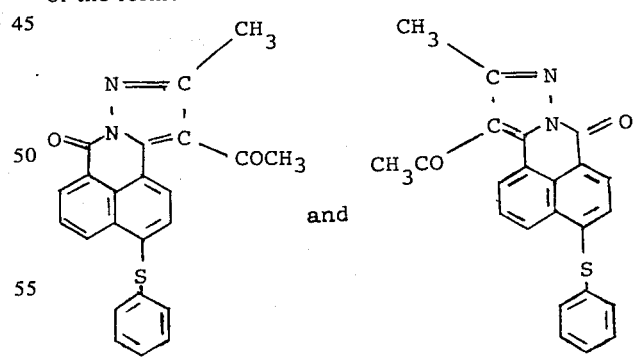

* * * * *